US012095234B2

(12) United States Patent
Sakuma et al.

(10) Patent No.: US 12,095,234 B2
(45) Date of Patent: Sep. 17, 2024

(54) SPARK PLUG

(71) Applicant: NITERRA CO., LTD., Aichi (JP)

(72) Inventors: Takeshi Sakuma, Aichi (JP); Yuichi Yamada, Aichi (JP); Haruki Yoshida, Aichi (JP); Hiroki Shimada, Aichi (JP); Takuto Koba, Aichi (JP)

(73) Assignee: NITERRA CO., LTD., Nagoya (JP)

( * ) Notice: Subject to any disclaimer, the term of this patent is extended or adjusted under 35 U.S.C. 154(b) by 0 days.

(21) Appl. No.: 18/567,550

(22) PCT Filed: Jun. 14, 2022

(86) PCT No.: PCT/JP2022/023731
§ 371 (c)(1),
(2) Date: Dec. 6, 2023

(87) PCT Pub. No.: WO2022/264996
PCT Pub. Date: Dec. 22, 2022

(65) Prior Publication Data

US 2024/0275137 A1 Aug. 15, 2024

(30) Foreign Application Priority Data

Jun. 14, 2021 (JP) ................................ 2021-098895

(51) Int. Cl.
*H01T 13/38* (2006.01)
*H01T 13/22* (2006.01)

(52) U.S. Cl.
CPC ............ *H01T 13/38* (2013.01); *H01T 13/22* (2013.01)

(58) Field of Classification Search
CPC ................................ H01T 13/38; H01T 13/22
See application file for complete search history.

(56) References Cited

U.S. PATENT DOCUMENTS 8,148,883 B2 4/2012 Honda et al.
11,183,819 B2 11/2021 Yokoyama et al.
(Continued)

FOREIGN PATENT DOCUMENTS

EP 2 854 243 A1 4/2015
JP 2007-250379 A 9/2007
(Continued)

OTHER PUBLICATIONS

International Search Report from corresponding International Patent Application No. PCT/JP2022/023731, dated Aug. 30, 2022.

*Primary Examiner* — Anne M Hines
(74) *Attorney, Agent, or Firm* — KUSNER & JAFFE

(57) ABSTRACT

A spark plug 1 of the present invention includes an insulator 2 made from an alumina-based sintered body and including: a leg portion 22 provided on a front end side; a middle trunk portion 23 provided on a rear end side of the leg portion 22 and having a larger diameter than the leg portion 22; and a flange portion 24 provided on the rear end side of the middle trunk portion 23 and having a larger diameter than the middle trunk portion 23. In the spark plug 1, in a state where a cut surface **23*b* obtained by cutting the middle trunk portion 23** in a direction perpendicular to an axial line AX direction at an arbitrary position in the axial line AX direction is mirror-polished, when 20 observation regions X each being 185 μm×250 μm are set so as not to overlap each other, and with respect to each of a plurality of pores included in the 20 observation regions X, a square value $P^2$ [$\mu m^2$] of a length P [μm] of a circumference of the pore is obtained, an average value of the square values $P^2$ [$\mu m^2$] of top 20 pores having the largest square values $P^2$ [$\mu m^2$] is not greater than 2200 $\mu m^2$, and a proportion T [%] of a total area of all pores included in the 20 observation regions X relative
(Continued)

to a total area (100%) of the 20 observation regions X is not greater than 5%.

4 Claims, 5 Drawing Sheets

(56) References Cited

U.S. PATENT DOCUMENTS

| | | | | |
|---|---|---|---|---|
| 2007/0228915 | A1 | 10/2007 | Honda et al. | |
| 2019/0229501 | A1* | 7/2019 | Niessner | H01T 13/39 |
| 2020/0112146 | A1 | 4/2020 | Yokoyama et al. | |
| 2021/0320480 | A1* | 10/2021 | Saito | H01T 21/02 |

FOREIGN PATENT DOCUMENTS

| | | | |
|---|---|---|---|
| JP | 2015-69828 | A | 4/2015 |
| JP | 2020-57559 | A | 4/2020 |

* cited by examiner

SPARK PLUG

FIELD OF THE INVENTION

The present invention relates to a spark plug.

BACKGROUND OF THE INVENTION

As a spark plug used in an internal combustion engine, there is a spark plug that includes an insulator having a tubular shape made from an alumina-based sintered body mainly composed of alumina (e.g., Patent Document 1). In recent years, with respect to the spark plug of this type, due to request for a reduced diameter, the diameter of the insulator has been reduced. When the diameter of the insulator is reduced, the thickness of the wall portion of the insulator having a tubular shape is reduced, and thus, a problem occurs in withstand voltage performance of the insulator in some cases. Thus, in recent years, further improvement of the withstand voltage performance of the insulator has been requested.

Patent Document 1: Japanese Unexamined Patent Application Publication No. 2020-57559

Usually, in the wall portion of an insulator having a tubular shape, fine pores (voids) are present to some extent. The pores of this type are inevitably formed in the course of manufacturing the insulator, and except when extremely large pores (e.g., pores of which the diameter exceeds 5,000 μm) are formed, the presence of the pores are usually not considered to be a problem. However, when the thickness of the wall portion of the insulator is reduced in association with reduction of the diameter of the insulator, the presence of the pores cannot be ignored, and the pores influence decrease in the withstand voltage performance of the insulator in some cases.

SUMMARY OF THE INVENTION

An object of the present invention is to provide a spark plug including an insulator excellent in withstand voltage performance.

The present inventors found that, in a spark plug including an insulator made from an alumina-based sintered body, when pores (voids) having a certain size or more and having an uneven surface are present inside a middle trunk portion of the insulator, local electric field concentration occurs at uneven contour portions surrounding the pores during use of the spark plug, thereby causing breakdown of the insulator.

Then, the present inventors conducted thorough studies in order to attain the above object, and found the following. That is, in a spark plug including an insulator made from an alumina-based sintered body, when the contour shapes of pores present in the middle trunk portion of the insulator, the sizes of pores, the presence proportion of pores, and the like are controlled so as to satisfy a predetermined condition described later, the withstand voltage performance of the insulator is ensured, and the present inventors completed the invention of the present application.

The means for solving the above problem are as follows. That is,

<1> A spark plug including an insulator made from an alumina-based sintered body and having a tubular shape extending along an axial line direction thereof, the insulator including: a leg portion provided on a front end side; a middle trunk portion provided on a rear end side of the leg portion and having a larger diameter than the leg portion; and a flange portion provided on the rear end side of the middle trunk portion and having a larger diameter than the middle trunk portion, wherein, in a mirror-polished surface obtained by mirror-polishing a cut surface obtained by cutting the middle trunk portion in a direction perpendicular to the axial line direction at an arbitrary position in the axial line direction, when 20 observation regions each being 185 μm×250 μm are set so as not to overlap each other, and with respect to each of a plurality of pores included in the 20 observation regions, a square value $P^2$ [$\mu m^2$] of a length P [μm] of a circumference of the pore is obtained, an average value of the square values $P^2$ [$\mu m^2$] of top 20 pores having the largest square values $P^2$ [$\mu m^2$] is not greater than 2200 $\mu m^2$, and a proportion T [%] of a total area of all pores included in the 20 observation regions relative to the total area (100%) of the 20 observation regions is not greater than 5%.

<2> The spark plug according to <1> above, wherein an area of cumulative 50% in a cumulative distribution of areas of the pores with respect to each of the 20 observation regions is a value exceeding 3 $\mu m^2$.

<3> The spark plug according to <1> or <2> above, wherein the proportion T is not greater than 3%.

<4> The spark plug according to any one of <1> to <3> above, wherein a thickness of the middle trunk portion is not greater than 2.0 mm.

According to the present invention, a spark plug including an insulator excellent in withstand voltage performance can be provided.

DETAILED DESCRIPTION OF THE INVENTION

First Embodiment

Figure 1:
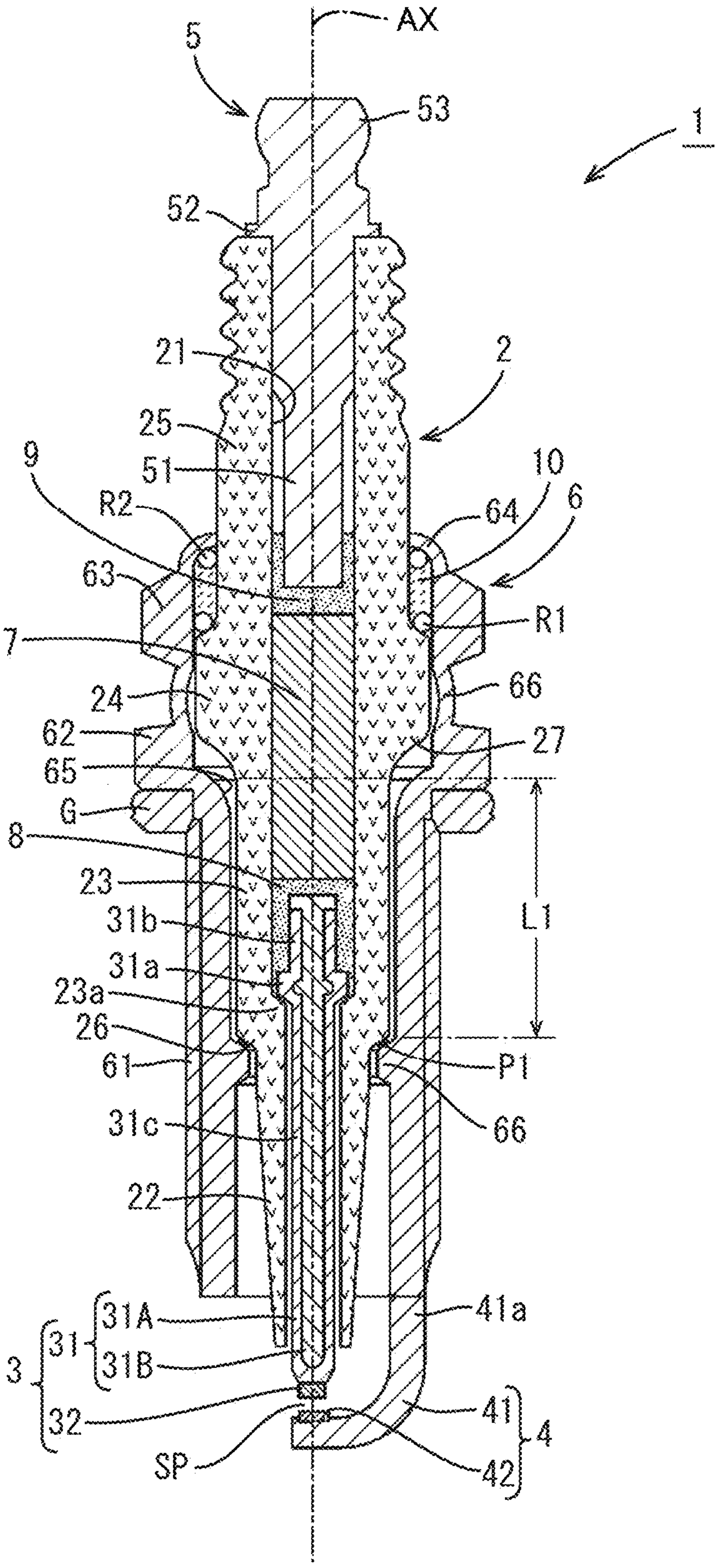
FIG. 1 is a sectional view along an axial line direction of a spark plug according to a first embodiment.

A spark plug 1 according to a first embodiment of the present invention will be described with reference to FIG. 1 to FIG. 4. FIG. 1 is a sectional view along an axial line AX direction of the spark plug 1 according to the first embodiment. An alternate long and short dash line extending in the up-down direction shown in FIG. 1 is an axial line AX of the spark plug 1. In FIG. 1, the longitudinal direction (the axial line AX direction) of the spark plug 1 corresponds to the up-down direction in FIG. 1. On the lower side in FIG. 1, the front end side of the spark plug 1 is shown, and on the upper side in FIG. 1, the rear end side of the spark plug 1 is shown.

The spark plug 1 is mounted to an engine (an example of an internal combustion engine) of an automobile, and is used for ignition of an air-fuel mixture in a combustion chamber of the engine. The spark plug 1 mainly includes an insulator 2, a center electrode 3, a ground electrode 4, a metal terminal 5, a metal shell 6, a resistor 7, and seal members 8, 9.

The insulator 2 is a substantially cylindrical member extending in the axial line AX direction and including a through-hole 21 therein. Details of the insulator 2 will be described later.

The metal shell 6 is a member used when mounting the spark plug 1 to the engine (specifically, an engine head), has, as a whole, a cylindrical shape extending in the axial line AX direction, and is formed from a conductive metal material (e.g., low-carbon steel material). At the outer peripheral surface on the front end side of the metal shell 6, a screw portion 61 is formed. A ring-shaped gasket G is externally fitted on the rear end (a so-called thread root) of the screw portion 61. The gasket G has an annular shape, and is formed by bending a metal plate. The gasket G is disposed between the rear end of the screw portion 61 and a seat portion 62 provided on the rear end side relative to the screw portion 61, and seals a space formed between the spark plug 1 and the engine (engine head) when the spark plug 1 is mounted to the engine.

A tool engagement portion 63 for engaging a tool such as a wrench when mounting the metal shell 6 to the engine is provided on the rear end side of the metal shell 6. A thin crimping portion 64 bent to the radially inner side is provided in a rear end portion of the metal shell 6.

The metal shell 6 includes therein an insertion hole 65 penetrating in the axial line AX direction, and, in a form of being inserted through the insertion hole 65, the insulator 2 is held inside the metal shell 6. The rear end of the insulator 2 is in a state of protruding to a large extent from the rear end of the metal shell 6 to the outer side (the upper side in FIG. 1). In contrast to this, the front end of the insulator 2 is in a state of slightly protruding from the front end of the metal shell 6 to the outer side (the lower side in FIG. 1).

Between the inner peripheral surface of the portion from the tool engagement portion 63 to the crimping portion 64 of the metal shell 6 and the outer peripheral surface (the outer peripheral surface of a rear-side tube portion 25 described later) of the insulator 2, a region having an annular shape is formed, and in the region, a first ring member R1 and a second ring member R2 each having an annular shape are disposed in a state of being separated from each other in the axial line AX direction. Powder of a talc 10 is filled between the first ring member R1 and the second ring member R2. The rear end of the crimping portion 64 is bent to the radially inner side, and is fixed to the outer peripheral surface (the outer peripheral surface of the rear-side tube portion 25 described later) of the insulator 2.

The metal shell 6 includes a thin compressive deformation portion 66 provided between the seat portion 62 and the tool engagement portion 63. During manufacture of the spark plug 1, the compressive deformation portion 66 is compressively deformed by the crimping portion 64, which is fixed to the outer peripheral surface of the insulator 2, being pressed to the front end side. Due to the compressive deformation of the compressive deformation portion 66, the insulator 2 is pressed to the front end side in the metal shell 6 through the first ring member R1, the second ring member R2, and the talc 10. At that time, the outer peripheral surface of a portion (a first diameter-enlarged portion 26 described later), which is a part of the insulator 2, enlarged in an annular shape to the outer side is pressed against, with a packing P1 interposed, the surface of a step portion 66 provided on the inner periphery side of the metal shell 6. Therefore, even when gas in the combustion chamber of the engine enters a space formed between the metal shell 6 and the insulator 2, the gas is prevented from leaking out to the outside by the packing P1 provided in the space.

In a state where the insulator 2 is mounted inside the metal shell 6, the center electrode 3 is provided inside the insulator 2. The center electrode 3 includes: a bar-like center electrode body 31 extending along the axial line AX direction; and a substantially columnar (substantially disc-shaped) tip (center electrode tip) 32 mounted to the front end of the center electrode body 31. The center electrode body 31 is a member having a length shorter in the longitudinal direction than those of the insulator 2 and the metal shell 6, and is held in the through-hole 21 of the insulator 2 such that the front end side of the center electrode body 31 is exposed to the outside. The rear end of the center electrode body 31 is housed inside (in the through-hole 21 of) the insulator 2. The center electrode body 31 includes an electrode base material 31A provided on the outer side, and a core portion 31B embedded in the electrode base material 31A. The electrode base material 31A is formed by using, for example, nickel or an alloy (e.g., NCF600, NCF601) mainly composed of nickel. The core portion 31B is formed from copper or a nickel-based alloy mainly composed of copper, which is excellent in thermal conductivity when compared with the alloy forming the electrode base material 31A.

The center electrode body 31 includes: an electrode flange portion 31*a* mounted to a predetermined position in the axial line AX direction; an electrode head portion 31*b*, which is a portion on the rear end side relative to the electrode flange portion 31*a*; and an electrode leg portion 31*c*, which is a portion on the front end side relative to the electrode flange portion 31*a*. In a state of being housed in the insulator 2, the electrode flange portion 31*a* is supported by a step portion 23*a* (described later) formed on the inner peripheral surface side of the insulator 2. The front end (i.e., the front end of the center electrode body 31) of the electrode leg portion 31*c* protrudes to the front end side relative to the front end of the insulator 2.

The tip 32 has a substantially columnar shape (substantially disc shape), and is joined to the front end (the front end of the electrode leg portion 31*c*) of the center electrode body 31 by resistance welding, laser welding, or the like. The tip 32 is made from a material (e.g., an iridium-based alloy mainly composed of iridium (Ir)) mainly composed of a noble metal having a high melting point.

The metal terminal 5 is a bar-like member extending in the axial line AX direction, and is mounted in a form of being inserted to the rear end side of the through-hole 21 of the insulator 2. The metal terminal 5 is disposed to the rear end side relative to the center electrode 3, in the insulator 2 (the through-hole 2:1). The metal terminal 5 is formed from a conductive metal material (e.g., low-carbon steel). The surface of the metal terminal 5 may be plated with nickel or the like for the purpose of anticorrosion or the like.

The metal terminal 5 includes: a bar-like terminal leg portion 51 provided on the front end side; a terminal flange portion 52 provided on the rear end side of the terminal leg portion 51; and a cap mounting portion 53 provided to the rear end side relative to the terminal flange portion 52. The terminal leg portion 51 is inserted in the through-hole 21 of the insulator 2. The terminal flange portion 52 is a portion that is exposed from a rear end portion of the insulator 2 and that is engaged with the rear end portion. The cap mounting portion 53 is a portion to which a plug cap (not shown) having a high-voltage cable connected thereto is mounted, and through the cap mounting portion 53, a high voltage for causing spark discharge is applied from outside.

The resistor 7 is disposed, in the through-hole 21 of the insulator 2, between the front end (the front end of the terminal leg portion 51) of the metal terminal 5 and the rear end (the rear end of the center electrode body 31) of the center electrode 3. The resistor 7 has a resistance (e.g., 5 kΩ) of not less than 1 kΩ, for example, and has a function of reducing electric wave noise at the time of occurrence of spark, for example. The resistor 7 is formed from a composition that contains glass particles as a main component, ceramic particles other than glass, and a conductive material.

A space is provided between the front end of the resistor 7 and the rear end of the center electrode 3 in the through-hole 21, and a conductive seal member 8 is provided in a form of filling the space. A space is also provided between the rear end of the resistor 7 and the front end of the metal terminal 5 in the through-hole 21, and a conductive seal member 9 is provided in a form of filling the space. Each seal member 8, 9 is formed from a conductive composition that contains glass particles of a $B_2O_3$—$SiO_2$-based material or the like and metal particles (Cu, Fe, etc.), for example.

The ground electrode 4 includes a ground electrode body 41 joined to the front end of the metal shell 6, and a ground electrode tip 42 having a quadrangular column shape. The ground electrode body 41 is made of, as a whole, a plate piece bent in a substantially L-shape at a portion, and a rear end portion 41*a* thereof is joined to the front end of the metal shell 6 by resistance welding or the like. Accordingly, the metal shell 6 and the ground electrode body 41 are electrically connected to each other. Similar to the metal shell 6, the ground electrode body 41 is formed by using, for example, nickel or a nickel-based alloy (e.g., NCF600, NCF601) mainly composed of nickel. Similar to the tip 32 of the center electrode 3, the ground electrode tip 42 is made from an iridium-based alloy mainly composed of iridium (Ir), for example. The ground electrode tip 42 is joined to a front end portion of the ground electrode body 41 by laser welding.

The ground electrode tip 42 at the front end portion of the ground electrode body 41 and the tip 32 at the front end portion of the center electrode 3 are disposed so as to be opposed to each other while keeping an interval with each other. That is, there is a space SP between the tip 32 at the front end portion of the center electrode 3 and the ground electrode tip 42 at the front end portion of the ground electrode 4, and when a high voltage is applied between the center electrode 3 and the ground electrode 4, spark discharge occurs, in the space SP, in a form of being generally along the axial line AX direction.

Next, the insulator 2 will be described in detail. The insulator 2, as a whole, has a tubular shape (cylindrical shape) elongated along the axial line AX direction and includes therein the through-hole 21 extending in the axial line AX direction, as shown in FIG. 1. The insulator 2 is formed from an alumina-based sintered body, having a tubular shape (cylindrical shape), which is mainly composed of alumina. The insulator 2 includes: a leg portion 22 provided on the front end side; a middle trunk portion 23 which is a portion provided on the rear end side of the leg portion 22 and which has a larger diameter than the leg portion 22; and a flange portion 24 which is a portion provided on the rear end side of the middle trunk portion 23 and which has a larger diameter than the middle trunk portion 23. The first diameter-enlarged portion 26 is provided between the leg portion 22 and the middle trunk portion 23, and a second diameter-enlarged portion 27 is provided between the middle trunk portion 23 and the flange portion 24.

The leg portion 22, as a whole, has an elongated tubular shape (cylindrical shape) of which the outer diameter is gradually increased from the front side toward the rear side, and has a smaller outer diameter than the middle trunk portion 23 and the first diameter-enlarged portion 26. When the spark plug 1 is mounted to the engine (engine head), the leg portion 22 is exposed in the combustion chamber of the engine.

The flange portion 24 is provided substantially at the center of the insulator 2 in the axial line AX direction, and has an annular shape. The resistor 7 is provided in the through-hole 21 inside the flange portion 24.

The first diameter-enlarged portion 26 is a portion connecting the leg portion 22 and the middle trunk portion 23, and has a cylindrical shape (annular shape) of which the outer diameter gradually increases from the front side toward the rear side. When the insulator 2 is mounted to the metal shell 6, the outer surface of this first diameter-enlarged portion 26 of the insulator 2 is placed against, with the packing P1 interposed, the surface of the step portion 66 provided on the inner periphery side of the metal shell 6.

The second diameter-enlarged portion 27 is a portion connecting the middle trunk portion 23 and the flange portion 24, and has a cylindrical shape (annular shape) of which the outer diameter is larger than the first diameter-enlarged portion 26 and of which the outer diameter gradually increases from the front side toward the rear side.

The middle trunk portion 23 has a tubular shape (cylindrical shape) of which the outer diameter is set to be substantially the same in the axial line AX direction. FIG. 1 shows a range L1 occupied by the middle trunk portion 23 in the axial line AX direction. In a state where the insulator 2 is mounted to the metal shell 6, a minute space is present between the outer surface (outer peripheral surface) of the middle trunk portion 23 and the inner surface (inner peripheral surface) of the metal shell 6. On the inner side (inner peripheral surface side) close to the front end of the middle trunk portion 23, the step portion 23*a* having an annular shape is provided. In a state where the center electrode body 31 of the center electrode 3 is housed in the through-hole 21 of the insulator 2, the electrode flange portion 31*a* of the center electrode body 31 is supported by the surface of the step portion 23*a*. The thickness (the thickness in the radial direction) of the wall portion of the middle trunk portion 23 is larger than the thickness of the wall portion of the leg portion 22. In the middle trunk portion 23, the thickness of the wall portion of the part from the front end side up to the step portion 23*a* is larger than the thickness of the wall portion of the part on the rear side thereof.

The outer peripheral surface of the middle trunk portion 23 is exposed to the atmosphere (air), and it can be said that the middle trunk portion 23 is in an environment in which electricity is easily conducted when compared with the leg portion 22. Therefore, the thickness of the wall portion of the middle trunk portion 23 is set to be larger than that of the leg portion 22.

In the present specification, unless otherwise specified, the "thickness of the middle trunk portion 23" denotes the thickness of the wall portion, in the middle trunk portion 23, of the part (i.e., the part on the rear end side relative to the step portion 23*a*) where the thickness of the wall portion is substantially constant. The thickness of the middle trunk portion 23 is not limited in particular as long as the object of the present invention is not impaired, and may be, for example, not greater than 3.0 mm or not greater than 2.0 mm. When the thickness of the middle trunk portion 23 is not greater than 2.0 mm, the technological effects of the present invention are more remarkably exhibited.

The insulator 2 further includes the rear-side tube portion 25 connected to the rear end side of the flange portion 24 and having a tubular shape (cylindrical shape) extending in the axial line AX direction. The rear-side tube portion 25 has an outer diameter smaller than the outer diameter of the flange portion 24. In the through-hole 21 inside the rear-side tube portion 25, the bar-like terminal leg portion 51 of the metal terminal 5, and the like, are provided.

The middle trunk portion 23 is the portion, in the insulator 2, that is most likely to be influenced by the diameter reduction, and in association with the diameter reduction, dielectric breakdown becomes more likely to occur. Therefore, when the middle trunk portion 23 at least has an internal structure including pores that satisfy all of Conditions 1, 2 shown below, the insulator 2 (the spark plug 1) excellent in withstand voltage performance is obtained.

<Condition 1>

Pores are included in the middle trunk portion 23 of the insulator 2 in the following manner. That is, in a mirror-polished surface obtained by mirror-polishing a cut surface (i.e., a cut surface obtained by cutting the middle trunk portion 23 into a round slice shape) 23*b* by cutting the middle trunk portion 23 in a direction perpendicular to the axial line AX direction at an arbitrary position in the axial line AX direction, when 20 observation regions (observation regions each having a rectangular shape of 185 μm vertically and 250 μm horizontally) each being 185 μm×250 μm are set so as not to overlap each other, and with respect to each of a plurality of pores included in the 20 observation regions, a square value $P^2$ [μm$^2$] of a length P [μm] of the circumference of the pore is obtained, and the average value of the square values $P^2$ [μm$^2$] of top 20 pores having the largest square values $P^2$ [μm$^2$] is not greater than 2200 μm$^2$.

<Condition 2>

With respect to all pores, the proportion T [%] of the total area of all pores included in the 20 observation regions relative to the total area (100%) of the 20 observation regions is not greater than 5%.

Figure 2:
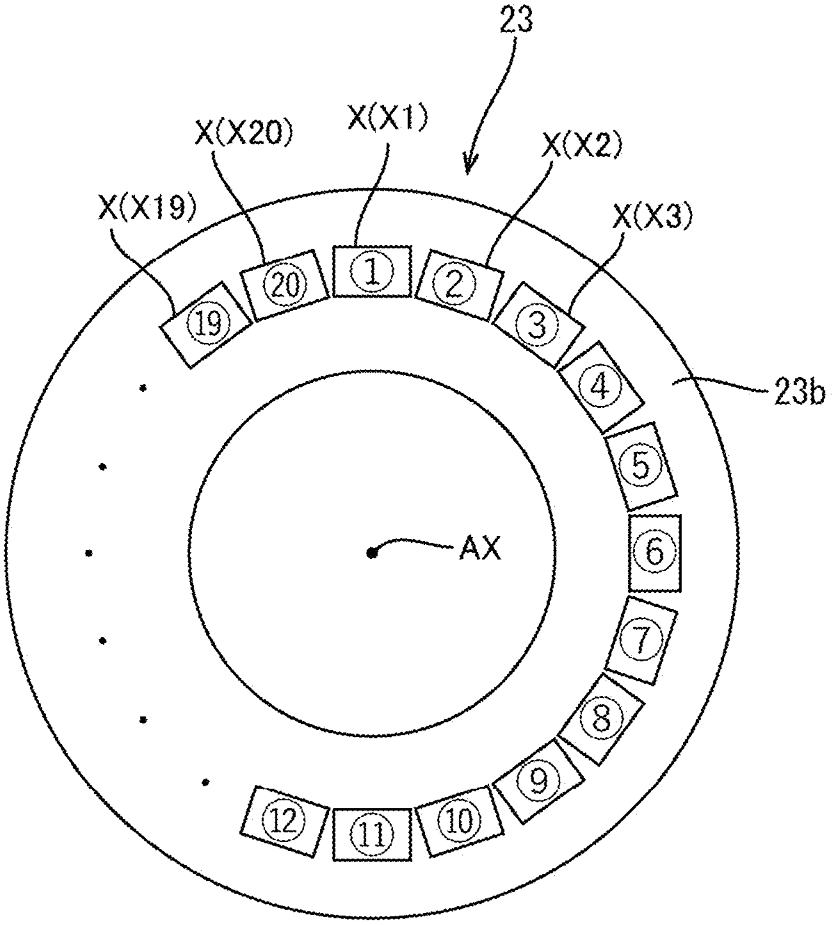
FIG. 2 schematically illustrates a cut surface of a middle trunk portion.
Figure 3:
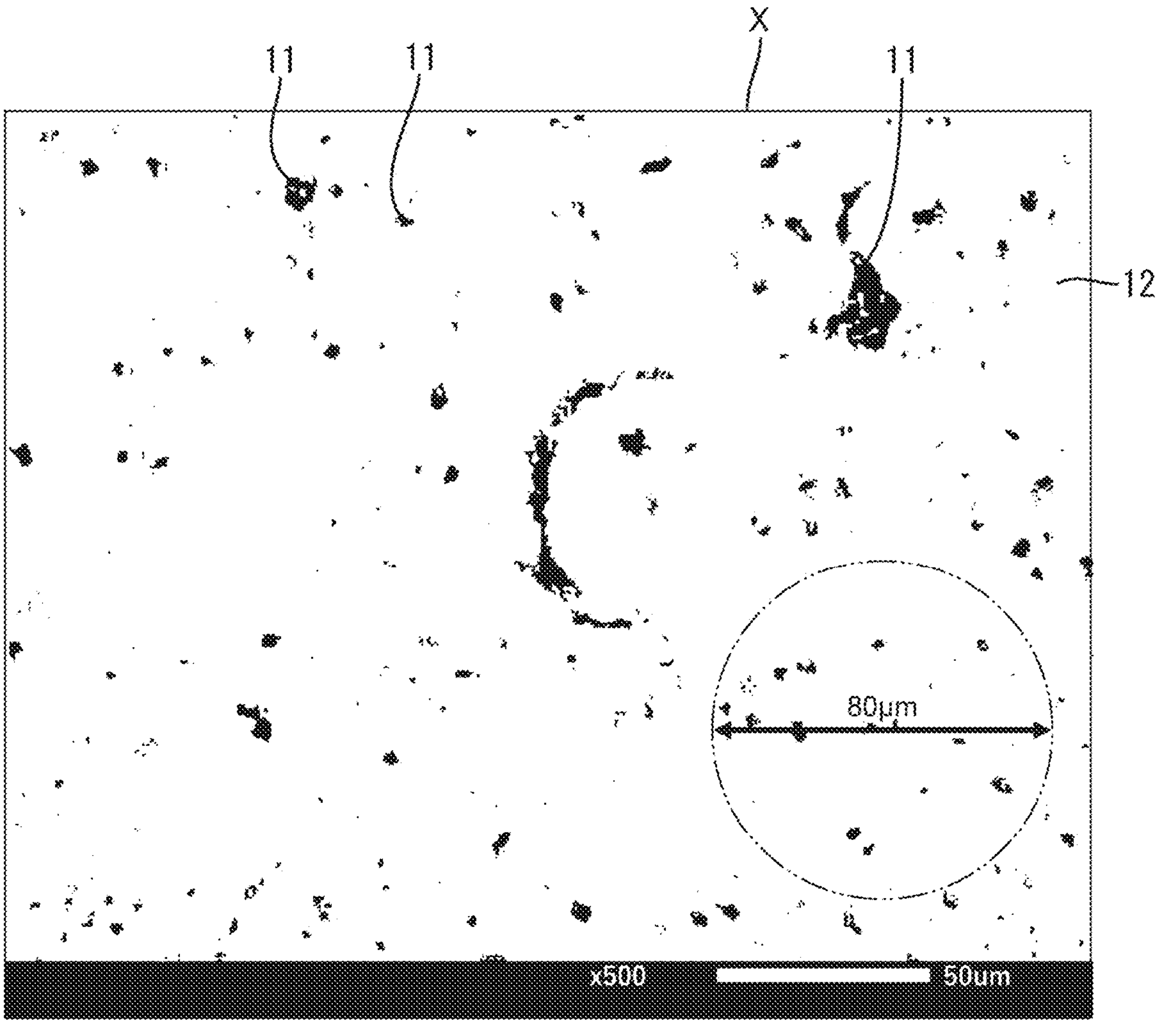
FIG. 3 illustrates a binarized image obtained through binarization of an SEM image corresponding to an observation region.
Figure 4:
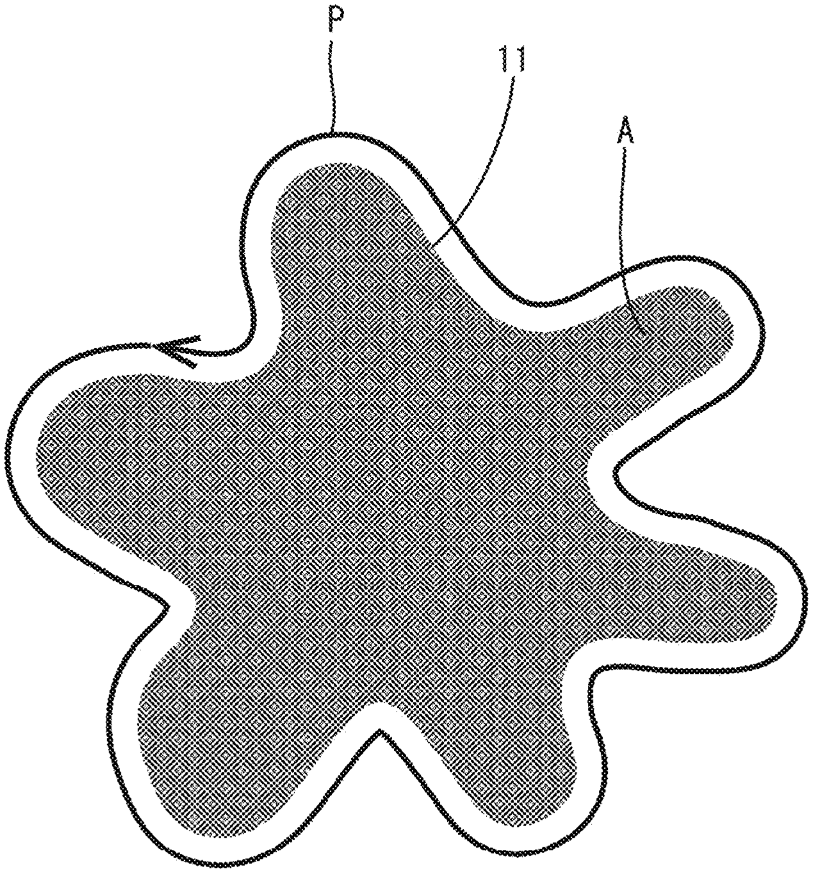
FIG. 4 schematically illustrates one pore arbitrarily selected from among all pores.

Here, with reference to FIG. 2 to FIG. 4 and the like, Conditions 1, 2 above will be more specifically described in detail. FIG. 2 schematically illustrates the cut surface 23*b* of the middle trunk portion 23. FIG. 2 shows the cut surface 23*b* in a state of a mirror-polished surface obtained by the middle trunk portion 23 being cut in a direction perpendicular to the axial line AX direction at an arbitrary position in the axial line AX direction, and after the cutting, being polished into a mirror state. In the present specification, the mirror-polished surface of the cut surface 23*b* may be represented by "a mirror-polished surface 23*b*", using the same symbol as that of the cut surface 23*b*.

The mirror-polishing treatment of the cut surface 23*b* is performed based on a known technique using a diamond grinding wheel, a diamond paste, or the like. The mirror-polishing treatment is performed until the surface roughness (Ra) of the cut surface 23*b* becomes about 0.001 μm, for example.

The mirror-polished surface 23*b* of the middle trunk portion 23 is observed by using a scanning electron microscope (SEM). Thus, the mirror-polished surface 23*b* may be subjected to carbon vapor deposition for providing conductivity as necessary. The acceleration voltage of the SEM is set to 20 kV, for example, and the magnification of the SEM is set to 500 times, for example.

As shown in FIG. 2, the mirror-polished surface 23*b* has an annular shape, and in the mirror-polished surface 23*b* having the annular shape, 20 observation regions X each having a size of 185 μm×250 μm are set to be arranged in one line in an annular shape so as not to overlap each other. Each observation region X is obtained as an SEM image of a predetermined place of the mirror-polished surface 23*b* captured by using the SEM. FIG. 2 schematically shows a plurality of observation regions X. In FIG. 2, in order to distinguish the observation regions X from each other, each symbol X is provided with a suffix (a number of 1 to 20). For example, out of the observation regions X, an observation region X1 is the first observation region X that has been set, and an observation region X20 is the twentieth observation region X that has been set.

With respect to the 20 SEM images in total corresponding to the 20 observation regions X in total having been set in this manner, image analysis processing (two dimensional image analysis processing) is performed by using known image analysis software (e.g., WinROOF (registered trademark)) that is executed on a computer.

In the image analysis processing, first, with respect to each individual SEM image, a size calibration process (calibration) according to a scale bar provided to the SEM image is performed. Next, binarization is performed on the SEM image after the calibration process. FIG. 3 illustrates a binarized image obtained through binarization of an SEM image corresponding to an observation region X. In the binarization, the brightness (lightness) of each pixel in the SEM image is expressed in two gradations by using a predetermined threshold (e.g., threshold=118). That is, with respect to a pixel of which the brightness is not greater than a threshold, the brightness of the pixel is set to "0", and with respect to a pixel of which the brightness exceeds the threshold, the brightness of the pixel is set to "255". The expression in the two gradations eliminates intermediate gradations, whereby a binarized image is obtained. In the binarized image in FIG. 3, pores 11 are shown in black, and the other portion (ceramic portion) 12 is shown in white.

From the binarized image corresponding to the observation region X, all pores (voids) included therein are extracted, and with respect to each extracted pore, the length P [μm] of the circumference of the pore is measured. FIG. 4 schematically illustrates one pore 11 arbitrarily selected from among all the pores. Then, further, with respect to each extracted pore, a square value P2 [μm$^2$] of the measured length P [μm] of the circumference of the pore is calculated. The square value P2 [μm$^2$] is obtained for each of all the pores 11 included in the 20 observation regions X.

After the square value $P^2$ [μm$^2$] is obtained for all the pores 11 in this manner, top 20 pores, out of the pores 11, having the largest square values $P^2$ [μm$^2$] are selected. Then, the average value of the square values $P^2$ [μm$^2$] of the top 20 pores is calculated. In the case of the present embodiment, the average value of the square values $P^2$ [μm$^2$] is set to not greater than 2200 μm$^2$.

The case where the average value of the square values $P^2$ [μm$^2$] is not greater than 2200 μm$^2$ means that, in the cut surface (mirror-polished surface) 23*b*, the contour shape of each pore included in the middle trunk portion 23 is preferably closer to a perfect circle, and the size of each pore included in the middle trunk portion 23 is preferably smaller.

Here, the technological significance of the square value $P^2$ [μm$^2$] of the pore is further described. Here, an arbitrary pore extracted from a binarized image is described as an example. The contour shape of the pore can be evaluated using the unevenness degree of the pore as an index. The unevenness degree of the pore is represented by $(P^2/A)\times(1/4\pi)$. As described above, P represents the length P [μm] of the circumference of the pore and A represents the area [μm$^2$] of the pore. The size of the pore can be evaluated based on the area A [μm$^2$] of the pore.

It is empirically known that, as an index V for collectively evaluating the "contour shape" and the "size" with respect to one pore, the product $((P^2/A)\times(1/4\pi)\times A)$ of the unevenness degree $((P^2/A)\times(1/4\pi))$ of the pore and the area A [$\mu m^2$] of the pore can be used. In this case, it is clear that the index V is proportional to the square value $P^2$ [$\mu m^2$], and thus, in the present embodiment, as an index for collectively evaluating the "contour shape" and the size" of one pore, the square value $P^2$ [$\mu m^2$] of the length P [$\mu m$] of the circumference of the pore is used.

With respect to each pore extracted from the binarized image corresponding to the observation region X, the area A [$\mu m^2$] is also measured. The measured area A [$\mu m^2$] of each pore is used in the definition of Condition 2 described later.

As shown in Condition 2 above, the pores 11 in the internal structure of the middle trunk portion 23 of the insulator 2 are adjusted such that the proportion T [%] of the total area of all the pores included in all the observation regions X relative to the area (the total area of the 20 observation regions X) (100%) of all the observation regions X is not greater than 5%. The total area of all the pores in Condition 2 is the sum of the areas A [$\mu m^2$] of the pores measured with respect to all the pores. In the present embodiment, it is preferable that the area A [$\mu m^2$] of one pore is adjusted to not greater than 5,000 $\mu m^2$. As a reference, for comparison with the sizes of the pores 11, a circle having an area of substantially 5,000 $\mu m^2$ is shown in the binarized image in FIG. 3.

Further, other than Conditions 1, 2 above, the internal structure of the middle trunk portion 23 may be adjusted so as to satisfy a condition shown below. Specifically, with respect to each of the 20 observation regions X, when the area distribution of pores is approximated by a logarithmic normal distribution, and the area of cumulative 50% in the cumulative distribution of the areas of the pores is obtained, the area of cumulative 50% may be a value exceeding 3 $\mu m^2$. When the middle trunk portion 23 satisfies such a condition, the insulator 2 excellent in impact resistance can be obtained.

Further, the internal structure of the middle trunk portion 23 may be adjusted so as to satisfy a condition shown below. Specifically, the proportion T [%] shown in Condition 2 above may be not greater than 3%.

Next, a method for manufacturing the insulator 2 will be described. The insulator 2 is one manufactured so as to satisfy Conditions 1, 2 and the like described above. The method for manufacturing the insulator 2 is not limited in particular as long as the finally obtained insulator 2 satisfies Conditions 1, 2 and the like. Here, an example of the method for manufacturing the insulator 2 is described.

The method for manufacturing the insulator 2 mainly includes a slurry production step, a deaeration step, a granulation step, a sieving step, a molding step, a grinding step, and a sintering step.

<Slurry Production Step>

The slurry production step is a step of producing a slurry by mixing a raw material powder, a binder, and a solvent. As for the raw material powder, as a main component, powder (hereinafter, Al compound powder) of a compound that is converted into alumina through sintering is used. As the Al compound powder, alumina powder is used, for example.

The particle diameter (median diameter) of the Al compound powder is not limited in particular as long as the object of the present invention is not impaired, and is 1.5 $\mu m$ to 2.5 $\mu m$, for example. The particle diameter is the median diameter (D50) based on volume measured by a laser diffraction method (a microtrac particle size distribution measuring device manufactured by Nikkiso Co., Ltd., product name "MT-3000").

When the mass (in oxide equivalent) of the alumina-based sintered body after sintering is defined as 100 mass %, the Al compound powder is prepared so as to account for preferably not less than 90 mass % in oxide equivalent. As long as the object of the present invention is not impaired, the raw material powder may contain powder other than the Al compound powder.

The binder is added in the slurry for the purpose of improving moldability of the raw material powder, and the like. Examples of the binder include hydrophilic binders such as polyvinyl alcohol, aqueous acrylic resin, gum Arabic, and dextrin. These may be used singly or in combination of two or more types.

The blending amount of the binder is not limited in particular as long as the object of the present invention is not impaired, and is blended, for example, in a proportion of 0.2 parts by mass to 1.5 parts by mass and preferably in a proportion of 0.3 parts by mass to 0.9 parts by mass, with respect to 100 parts by mass of the raw material powder.

The solvent is used for the purpose of, for example, dispersing the raw material powder and the like. Examples of the solvent include water and alcohol. These may be used singly or in combination of two or more types.

The blending amount of the solvent is not limited in particular as long as the object of the present invention is not impaired, and is blended, for example, in a proportion of 35 parts by mass to 45 parts by mass and preferably in a proportion of 38 parts by mass to 42 parts by mass, with respect to 100 parts by mass of the raw material powder. A component other than the raw material powder, the binder, and the solvent may be blended as necessary in the slurry. For mixing the slurry, a known stirring/mixing device or the like can be used.

<Deaeration Step>

A deaeration step may be performed as necessary on the slurry after the slurry production step. In the deaeration step, for example, a container holding the slurry after the mixing (kneading) is disposed in a vacuum deaeration device, and pressure reduction is performed so that the container is in a low atmospheric pressure environment, whereby bubbles contained in the slurry are removed. Through comparison of the density of the slurry before and after the deaeration, the amount of bubbles in the slurry can be grasped.

<Granulation Step>

The granulation step is a step of producing spherical granulated powder from the slurry containing the raw material powder and the like. The method for producing granulated powder from the slurry is not limited in particular as long as the object of the present invention is not impaired, and an example thereof is a spray-dry method. In the spray-dry method, the slurry is spray-dried by using a predetermined spray-dryer device, whereby granulated powder having a predetermined particle diameter can be obtained.

<Sieving Step>

The sieving step is a step of causing the granulated powder to pass through a sieve having a predetermined mesh size, to remove foreign matter and the like included in the granulated powder. The mesh size of the sieve used in the sieving step is set to have a size of, for example, 150% to 300% with respect to the average particle diameter of the granulated powder. More specifically, the mesh size of the sieve is adjusted in a range of not less than 150 $\mu m$ and not greater than 350 $\mu m$.

<Molding Step>

The molding step is a step of obtaining a molded body by molding the granulated powder into a predetermined shape with use of a mold. The molding step is performed through rubber press molding, die press molding, or the like. In the case of the present embodiment, the pressure (pressure increase rate in pressing) to be applied from the outer peripheral side to the mold (e.g., an inner rubber mold and an outer rubber mold of a rubber press molding machine) is adjusted so as to be increased stepwise. When a pressure-increase stop time of not less than 0.2 seconds is provided when the pressure is not greater than half of the maximum press pressure during mold pressing, uncrushed granules are eliminated, and the size and the shape of the pores can be controlled. When a pressure-increase stop time is provided when the press pressure is larger than half of the maximum press pressure, excessive pressure is applied to the molded body, thereby causing a defect such as a cut (crack) in the molded body. The "pressure-increase stop" denotes a case where the value of increase/decrease in the press pressure is not greater than $1/20$ of the maximum press pressure.

<Grinding Step>

The grinding step is a step of removing the machining allowance of the molded body obtained after the molding step, polishing the surface of the molded body, and the like. In the grinding step, removal of the machining allowance, polishing of the surface of the molded body, and the like are performed through grinding with a resinoid grinding wheel or the like. Through this grinding step, the shape of the molded body is adjusted.

<Sintering Step>

The sintering step is a step of obtaining an insulator by sintering the molded body of which the shape has been adjusted in the grinding step. In the sintering step, for example, sintering is performed in an air atmosphere at not less than 1450° C. and not greater than 1650° C. for 1 to 8 hours. After the sintering, the molded body is cooled, whereby the insulator 2 made from the alumina-based sintered body is obtained.

Using the insulator 2 obtained as described above, the spark plug 1 of the present embodiment is manufactured. The components other than the insulator 2 of the spark plug 1 are similar to known components as described above.

Hereinafter, the present invention will be described in further detail, based on Examples. It should be noted the present invention is not limited in any way by these Examples.

Example 1

(Production of Test Sample)

Insulators (41 in total) (hereinafter, test samples) of which the basic configuration was the same as that of the insulator of the spark plug described as an example in the first embodiment above were produced by a manufacturing method similar to that in the first embodiment above. The middle trunk portion of the test sample had a cylindrical shape, and the thickness thereof was 2.0 mm.

(Measurement of Underwater Withstand Voltage)

Figure 5:
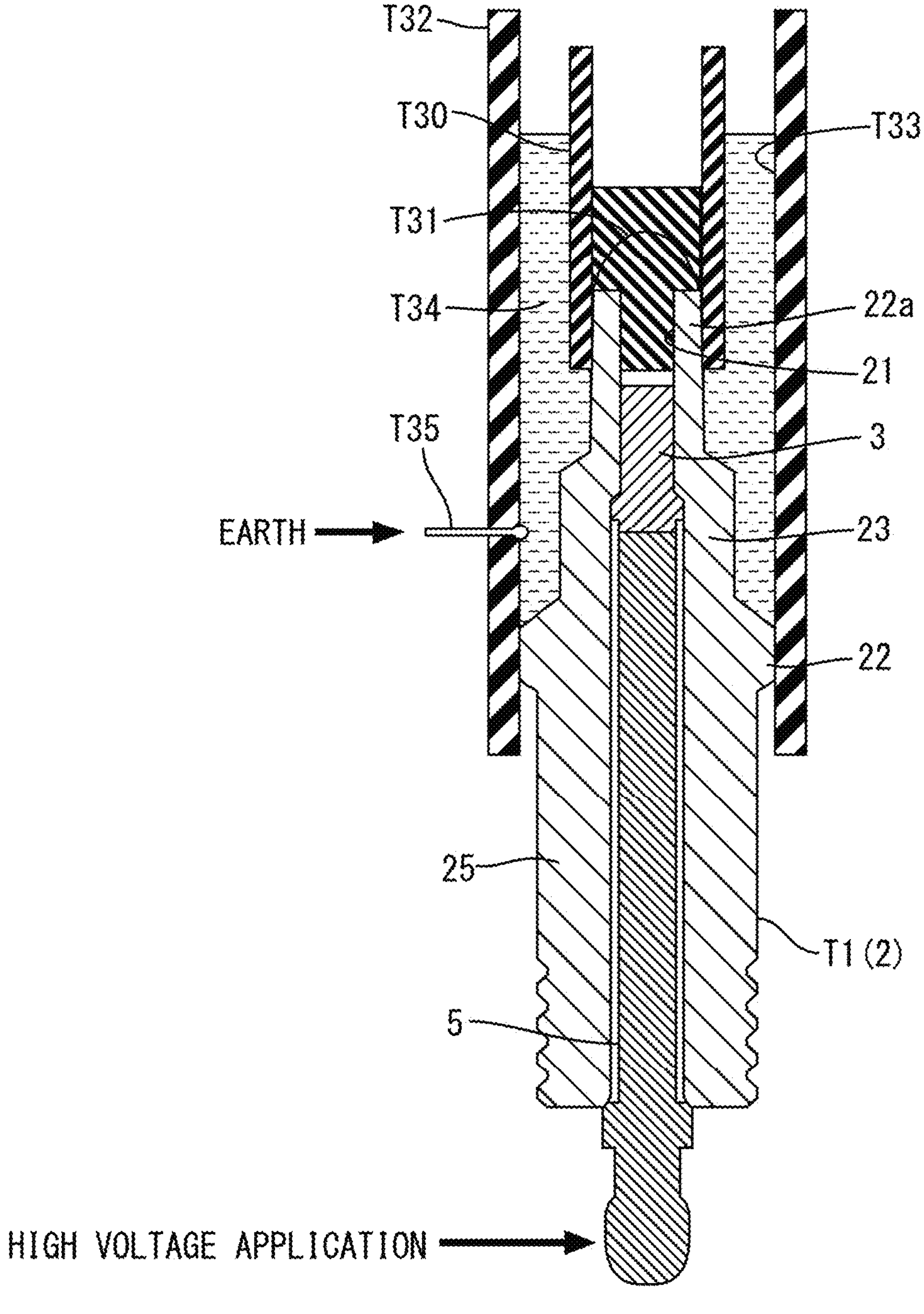
FIG. 5 schematically illustrates a method for measuring shoot-through voltage of a test sample according to an underwater withstand voltage test.

An underwater withstand voltage test shown below was performed and shoot-through voltage was measured. Specific details are as follows. FIG. 5 schematically illustrates a method for measuring shoot-through voltage of a test sample T1 according to an underwater withstand voltage test. As shown in FIG. 5, first, as preparation before the test for the test sample T1 (the insulator 2 of the spark plug), a first silicone tube T30 was mounted to a front end portion 22*a* of the insulator 2, and in this state, a silicone rubber T31 was injected for the purpose of insulation into the through-hole 21 in the front end portion 22*a*, and was solidified. The length of the center electrode 3 was adjusted in advance by cutting or the like, so as to prevent the center electrode 3 from coming into contact with the solidified silicone rubber T31. Next, a second silicone tube T32 having a larger inner diameter than the first silicone tube T30 was prepared, and the second silicone tube T32 was mounted to the flange portion 24 of the insulator 2 such that the front end portion 22*a* having mounted thereto the first silicone tube T30 was disposed on the inner side of the second silicone tube T32. Then, a space T33 formed between the second silicone tube T32 and the first silicone tube T30 was filled with a salt solution (concentration: 1 mass %) T34. The center electrode 3 and the metal terminal 5 were mounted from the rear end side of the rear-side tube portion 25, in a form of being inserted into the through-hole 21 therein, as shown in FIG. 5. Then, a test needle T35 was mounted to the second silicone tube T32 so as to be at the substantially center position of the middle trunk portion 23, in the axial line direction of the test sample T1 (the insulator 2), and such that the leading end of the test needle T35 was in contact with the salt solution T34. The thus mounted test needle T35 was used as the earth side, and a high voltage was applied under a condition described later, to the metal terminal 5 exposed from the rear end of the test sample T1 (the insulator 2). Specifically, while looking at an oscilloscope, the voltage was increased from a start voltage (20 kV) to 30 kV at 1 kV/sec. The voltage was increased from the start voltage by 1 kV, each voltage was kept for 10 seconds, and the shoot-through voltage was recorded. In the underwater withstand voltage test, the wiring on the high voltage side was disposed so as to be exposed to air as much as possible, and necessary minimum parts were placed on the insulating material. In the tests for all the test samples T1, the same center electrode 3 and the same metal terminal 5 were used. Such operations were performed on 20 test samples (insulators). The test result was obtained as the average value with respect to the 20 test samples. The results are shown in Table 1.

(Evaluation of Impact Resistance)

With respect to each test sample, the Charpy test defined in JIS B7733 was performed, and the breaking energy at which the test sample (insulator) was broken was measured. Specific details are as follows. First, using the insulator, which was a test sample, a spark plug (hereinafter, test spark plug) having a configuration similar to that described as an example in the first embodiment above was produced. The axial line direction of the test spark plug was defined as the up-down direction, the front end side was directed downwardly, and the screw portion of the metal shell of the test spark plug was screwed into a screw hole provided in a test stand, to fix the test spark plug. A hammer having a shaft fulcrum above in the axial line direction of the fixed test spark plug was provided so as to be rotatable. Then, the front end of the hammer was raised and then released, to rotate the hammer by free fall, whereby the front end of hammer was caused to collide with a portion at substantially 1 mm from the rear end of the insulator. While the raising angle (the angle with respect to the axial line direction) of this hammer was increased by a predetermined angle, the front end of the hammer was caused to collide with the insulator of the test spark plug. This operation was repeated, and the Charpy breaking energy [J] of the insulator was obtained based on the raising angle at the time of occurrence of breakage in the insulator. This operation was performed for 20 test samples (insulators). The test result was obtained as the average value with respect to the 20 test samples. The results are shown in Table 1.

(Observation of Cut Surface of Middle Trunk Portion)

The middle trunk portion of the obtained test sample was cut perpendicularly to the axial line direction, and the obtained cut surface was polished into a mirror state, and then, the structure of the cut surface (mirror-polished surface) was observed by an SEM. The acceleration voltage of the SEM was set to 20 kV, and the magnification of the SEM was set to 500 times. Then, in the cut surface (mirror-polished surface), 20 observation regions (185 μm×250 μm) were set so as not to overlap each other, and 20 SEM images in total corresponding to the 20 observation regions were acquired. With respect to those SEM images, image analysis processing was executed by image analysis software (WinROOF (registered trademark)), whereby, with respect to each of a plurality of pores included in the 20 observation regions, the length P [μm] of the circumference of the pore and the square value $P^2$ [μm] were obtained. Then, out of the plurality of pores, top 20 pores having the largest square values $P^2$ [μm] were selected, and the average value of the square values $P^2$ [μm] of the selected 20 pores was calculated. The results are shown in Table 1.

middle trunk portion was changed to 3.0 mm and the press pressure in the pressure-increase stop time during mold pressing in the molding step was changed.

Comparative Examples 1, 2

Test samples of Comparative Examples 1, 2 were produced in a similar manner to that in Example 1, except that the pressure-increase stop time was not provided during mold pressing in the molding step.

Comparative Example 3

A test sample of Comparative Example 3 was produced in a similar manner to that in Example 1, except that the thickness of the middle trunk portion was changed to 3.0 mm and the pressure-increase stop time was not provided during mold pressing in the molding step.

With respect to each obtained test sample, "measurement of underwater withstand voltage", "evaluation of impact resistance", and "observation of cut surface" above were performed, as in Example 1. The results are shown in Table 1. With respect to Example 10 and Comparative Example 3, evaluation of impact resistance was not performed.

TABLE 1

| | AVERAGE VALUE OF P2 VALUE (TOP 20 PORES) [μm2] | AREA OF CUMULATIVE DEGREE OF 50% [μm2] | THICKNESS OF MIDDLE TRUNK PORTION [mm] | VOID PERCENTAGE (PROPORTION T) [%] | UNDERWATER WITHSTAND VOLTAGE [kV/mm] | CHARPY BREAKING ENERGY [J] | PRESENCE/ ABSENCE OF PRESSURE-INCREASE STOP TIME |
|---|---|---|---|---|---|---|---|
| EXAMPLE 1 | 1470 | 5.2 | 2 | 2.0 | 48 | 0.92 | ○ |
| EXAMPLE 2 | 2200 | 9.0 | 2 | 2.6 | 47 | 0.90 | ○ |
| COMPARATIVE EXAMPLE 1 | 7820 | 11.7 | 2 | 3.4 | 40 | 0.90 | x |
| COMPARATIVE EXAMPLE 2 | 3420 | 10.3 | 2 | 3.1 | 44 | 0.91 | x |
| EXAMPLE 3 | 1955 | 8.5 | 2 | 3.5 | 46 | 0.90 | ○ |
| EXAMPLE 4 | 2200 | 9.0 | 2 | 5.0 | 46 | 0.91 | ○ |
| EXAMPLE 5 | 1465 | 3.0 | 2 | 2.7 | 48 | 0.87 | ○ |
| EXAMPLE 6 | 1465 | 2.0 | 2 | 2.4 | 48 | 0.81 | ○ |
| EXAMPLE 7 | 970 | 3.0 | 2 | 0.7 | 48 | 0.70 | ○ |
| EXAMPLE 8 | 1465 | 3.5 | 2 | 1.0 | 48 | 0.90 | ○ |
| EXAMPLE 9 | 1955 | 8.4 | 2 | 3.0 | 47 | 0.90 | ○ |
| EXAMPLE 10 | 1465 | 6.0 | 3 | 1.9 | 50 | — | ○ |
| COMPARATIVE EXAMPLE 3 | 7820 | 11.5 | 3 | 3.3 | 45 | — | x |

The proportion T [%] of the total area of all the pores relative to the total area (100%) of the 20 observation regions was obtained. The results are shown in Table 1.

Further, with respect to each of the 20 observation regions, the area distribution of pores was approximated by a logarithmic normal distribution, and the area [μm] of cumulative 50% in the cumulative distribution of the areas of the pores was obtained. The results are shown in Table 1.

Examples 2 to 91

Test samples of Examples 2 to 9 were produced in a similar manner to that in Example 1, except that, during mold pressing in the molding step, the press pressure in the pressure-increase stop time was changed as appropriate.

Example 10

A test sample of Example 10 was produced in a similar manner to that in Example 1, except that the thickness of the middle trunk portion was changed to 3.0 mm and the press pressure in the pressure-increase stop time during mold pressing in the molding step was changed.

As shown in Table 1, in each of the cases of Examples 1 to 9 in which the thickness of the middle trunk portion was 2 mm, with respect to top 20 pores having the largest square values $P^2$ [$\mu m^2$], the average value of the square values $P^2$ [$\mu m^2$] of those pores is not greater than 2200 $\mu m^2$, and the withstand voltage performance is excellent. In each of Examples 1 to 9, the proportion T [%] of the total area of all the pores included in the 20 observation regions relative to the total area (100%) of the 20 observation regions is not greater than 5.0%. In Examples 1 to 9, pores having an area exceeding 5,000 μm were not observed.

In contrast to this, in the cases of Comparative Examples 1, 2, in which the thickness of the middle trunk portion was 2 mm, the average values of the square values $P^2$ [$\mu m^2$] were 7820 $\mu m^2$ and 3420 $\mu m^2$, respectively, and it was confirmed that the withstand voltage performance was lower than those in Examples 1 to 9.

Example 10 in which the thickness of the middle trunk portion was 3 mm was confirmed to be excellent in withstand voltage performance when compared with that in Comparative Example 3 in which the thickness of the middle trunk portion was also 3 mm.

Examples 1 to 4 and Examples 8, 9 out of Examples 1 to 9 were cases where the area of cumulative 50% in the cumulative distribution of the areas of the pores exceeded 3 $\mu m^2$, and it was confirmed that such Examples were each excellent in impact resistance when compared with those in Examples 5 to 7 in which the area of cumulative 50% was not greater than 3 $\mu m^2$.

In each of Examples 1, 2 and Examples 5 to 9 out of Examples 1 to 9, the proportion T [%] was not greater than 3%, and it was confirmed that Examples 1, 2 and Examples 5 to 9 were excellent in withstand voltage performance when compared with those in Examples 3, 4.

When Example 1 in which the thickness of the middle trunk portion was 2 mm and the average value of the square values $P^2$ [$\mu m^2$] was 1470 $\mu m^2$ was compared with Comparative Example 1 in which the average value of the square values $P^2$ [$\mu m^2$] was 7820 $\mu m^2$, the difference in the underwater withstand voltage was 8 kV/mm. In contrast to this, when Example 10 in which the thickness of the middle trunk portion was 3 mm and the average value of the square values $P^2$ [$\mu m^2$] was 1465 $\mu m^2$ was compared with Comparative Example 3 in which the average value of the square values $P^2$ [$\mu m^2$] was 7820 $\mu m^2$, the difference in the underwater withstand voltage was 5 kV/mm. Thus, it was confirmed that, even when the square values $P^2$ [$\mu m^2$] are at similar levels, if the thickness of the middle trunk portion is smaller, the withstand voltage performance was improved to a larger extent.

EXPLANATION OF SYMBOLS

1: spark plug
2: insulator
21: through-hole
22: leg portion
23: middle trunk portion
**23*b***: cut surface (mirror-polished surface)
24: flange portion
25: rear-side tube portion
26: first diameter-enlarged portion
27: second diameter-enlarged portion
3: center electrode
4: ground electrode
5: metal terminal
6: metal shell
7: resistor
8: seal member
9: seal member
11: pore
AX: axial line

What is claimed is:

1. A spark plug comprising an insulator made from an alumina-based sintered body and having a tubular shape extending along an axial line direction thereof, the insulator including:

a leg portion provided on a front end side;

a middle trunk portion provided on a rear end side of the leg portion and having a larger diameter than the leg portion; and a flange portion provided on the rear end side of the middle trunk portion and having a larger diameter than the middle trunk portion, wherein in a mirror-polished surface obtained by mirror-polishing a cut surface obtained by cutting the middle trunk portion in a direction perpendicular to the axial line direction at an arbitrary position in the axial line direction, when 20 observation regions each being 185 μm×250 μm are set so as not to overlap each other, and with respect to each of a plurality of pores included in the 20 observation regions, a square value $P^2$ [$\mu m^2$] of a length P [μm] of a circumference of the pore is obtained, an average value of the square values $P^2$ [$\mu m^2$] of top 20 pores having the largest square values $P^2$ [$\mu m^2$] is not greater than 2200 $\mu m^2$, and a proportion T [%] of a total area of all pores included in the 20 observation regions relative to the total area (100%) of the 20 observation regions is not greater than 5%.

2. The spark plug according to claim 1, wherein an area of cumulative 50% in a cumulative distribution of areas of the pores with respect to each of the 20 observation regions is a value exceeding 3 $\mu m^2$.

3. The spark plug according to claim 1, wherein the proportion T is not greater than 3%.

4. The spark plug according to claim 1, wherein a thickness of the middle trunk portion is not greater than 2.0 mm.

* * * * *